US009174852B2

(12) United States Patent
Chester et al.

(10) Patent No.: US 9,174,852 B2
(45) Date of Patent: *Nov. 3, 2015

(54) METHODS TO IMPROVE FILTRATION FOR THE BAYER PROCESS

(71) Applicant: NALCO COMPANY, Naperville, IL (US)

(72) Inventors: Ryan Chester, Heathridge (AU); Jing Wang, Aurora, IL (US); John D Kildea, Baldivis (AU)

(73) Assignee: NALCO COMPANY, Naperville, IL (US)

( * ) Notice: Subject to any disclaimer, the term of this patent is extended or adjusted under 35 U.S.C. 154(b) by 259 days.

This patent is subject to a terminal disclaimer.

(21) Appl. No.: 13/662,964

(22) Filed: Oct. 29, 2012

(65) Prior Publication Data
US 2013/0058847 A1   Mar. 7, 2013

Related U.S. Application Data

(63) Continuation-in-part of application No. 12/852,910, filed on Aug. 9, 2010, now Pat. No. 8,298,508.

(51) Int. Cl.
*B01D 37/03* (2006.01)
*B01D 37/04* (2006.01)
*B01D 21/01* (2006.01)
*C01F 7/14* (2006.01)
*C01F 7/06* (2006.01)
*C01F 7/47* (2006.01)

(52) U.S. Cl.
CPC .......... *C01F 7/145* (2013.01); *B01D 21/01* (2013.01); *B01D 37/03* (2013.01); *B01D 37/04* (2013.01); *C01F 7/0653* (2013.01); *C01F 7/148* (2013.01); *C01F 7/47* (2013.01)

(58) Field of Classification Search
CPC ........ B01D 37/03; B01D 37/04; B01D 37/00; B01D 67/0006; B01D 69/125; C01F 7/148
See application file for complete search history.

(56) References Cited

U.S. PATENT DOCUMENTS

| 5,008,089 A | 4/1991 | Moody et al. |
| 6,726,845 B1 | 4/2004 | Barham et al. |
| 2008/0107578 A1 | 5/2008 | Wang et al. |
| 2012/0034142 A1 | 2/2012 | Wang et al. |

FOREIGN PATENT DOCUMENTS

| WO | WO9961129 A1 | 12/1999 |
| WO | WO2009-085514 A2 | 7/2009 |

Primary Examiner — Anthony J Zimmer
Assistant Examiner — Justin Bova
(74) Attorney, Agent, or Firm — Benjamin Carlsen

(57) ABSTRACT

The invention provides methods and compositions for improving the production of alumina trihydrate. The invention involves adding one or more cross-linked polysaccharides to a filter used to separate solids from liquid in the Bayer process. The one or more polysaccharides can be a cross-linked polysaccharide (such as cross-linked dextran or cross-linked dihydroxypropyl cellulose). The cross-linked polysaccharides can impart a number of advantages including greater flow rate and lower residual moisture in the resulting cake.

16 Claims, 3 Drawing Sheets

METHODS TO IMPROVE FILTRATION FOR THE BAYER PROCESS

CROSS-REFERENCE TO RELATED APPLICATIONS

This application is a continuation in part of co-pending US patent application Ser. No. 12/852,910 filed on Aug. 9, 2010.

STATEMENT REGARDING FEDERALLY SPONSORED RESEARCH OR DEVELOPMENT

Not Applicable.

BACKGROUND OF THE INVENTION

The invention relates to a method for improving the Bayer process for the production of alumina trihydrate and alumina from bauxite ore. The invention concerns the use of cross-linked polysaccharides, specifically cross-linked dextran or cross-linked dihydroxypropyl cellulose to improve the performance of the filtration processes within the Bayer process.

In the typical Bayer process for the production of alumina trihydrate, bauxite ore is pulverized, slurried with caustic solution, and then digested at elevated temperatures and pressures. The caustic solution dissolves oxides of aluminum, forming an aqueous sodium aluminate solution. The caustic-insoluble constituents of bauxite ore, along with insoluble materials precipitated within the digestion processes, are together commonly referred to as red mud. Within the Bayer process the red mud solids are then separated from the aqueous liquor phase containing the dissolved sodium aluminate. This separation typically involves concentrating the bulk of the solids through settling tanks with flocculation, followed by filtration of the clarified overflow liquor to remove any residual solids remaining in the clarified liquor.

The concentrated underflow of red mud solids that result from the settling process are typically subjected to a series of washing steps to extract the remaining liquor that is present within the concentrated slurry. After the washing steps, the washed, concentrated solids slurry may then be subjected to filtration to remove excess liquid, prior to disposal or re-use of the solids.

As indicated above, the aqueous sodium aluminate solution, which has had the bulk of the insoluble red mud solids removed in the settling process after digestion, is typically subjected to a filtration step to remove any remaining insoluble material. The liquor resulting from this filtration is essentially free of any insoluble red mud residue. It is then cooled and solid alumina trihydrate product is precipitated out of the solution. The precipitated trihydrate is then most often separated into size fractions; larger particles being collected for further processing as product, while smaller sized particles are collected and re-used in the precipitation step as seed crystals. Again, the separation of the solid trihydrate particles from the liquor can be achieved using a number of means including settling, flocculation and filtration. Both product sized particles and seed particles may be subjected to some form of filtration to achieve appropriate separation from the liquor, which is subsequently returned to the digestion step of the process and re-used.

As described at least in part, among other places, in U.S. Pat. Nos. 6,814,873, 6,033,579, 6,048,463, and US Published Patent Application 2008/0257827, the Bayer process is constantly evolving and the specific techniques employed in industry for the various steps of the process not only vary from plant to plant, but also are often held as trade secrets.

While plant designs and operations may differ substantially and additional filtration steps can and do occur in various areas within the process, there is typically a number of key filtration steps used to assist or enhance the separation of solids from the liquid phases in Bayer process plants. Such filtration steps include, but are not limited to:

(a) Red Mud Security filtration—Filtration of primary settler overflow slurry
(b) Alumina Trihydrate Product filtration—Filtration of slurry containing product size alumina trihydrate
(c) Alumina Trihydrate Seed filtration—Filtration of slurry containing seed size alumina trihydrate
(d) Mud Filtration—Filtration of washed red mud slurry These filtration steps can include, but are not limited to, processes utilizing gravity, pressure, vacuum or a combination of these, as the underlying means of achieving filtration of the input slurry. Filtration steps may also involve washing of the filtered solids.

The operation and efficiency of each of the relevant filtration steps is a key factor in the effective operation of a Bayer process plant as a whole. As a result, there is a clear need and utility for methods to enhance and improve the filtration processes. Individual filtration processes may be enhanced by an improvement in the rate (throughput) of slurry through the filter and/or an improvement in the filtration efficiency (which may be considered as the quantity of liquid remaining with the solid material after filtration, as measured by residual liquor or moisture in the filtered solid cake). Such enhancements of the filtration processes are desirable across the range of filtration steps associated with the Bayer process.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 CFR §1.56(a) exists.

BRIEF SUMMARY OF THE INVENTION

The invention is directed towards enhancing the filtration steps utilized within the Bayer process by addition of cross-linked polysaccharides to the slurry entering the filtration step.

BRIEF DESCRIPTION OF THE DRAWINGS

A detailed description of the invention is hereafter described with specific reference being made to the drawings in which.

DETAILED DESCRIPTION OF THE INVENTION

Figure 1:
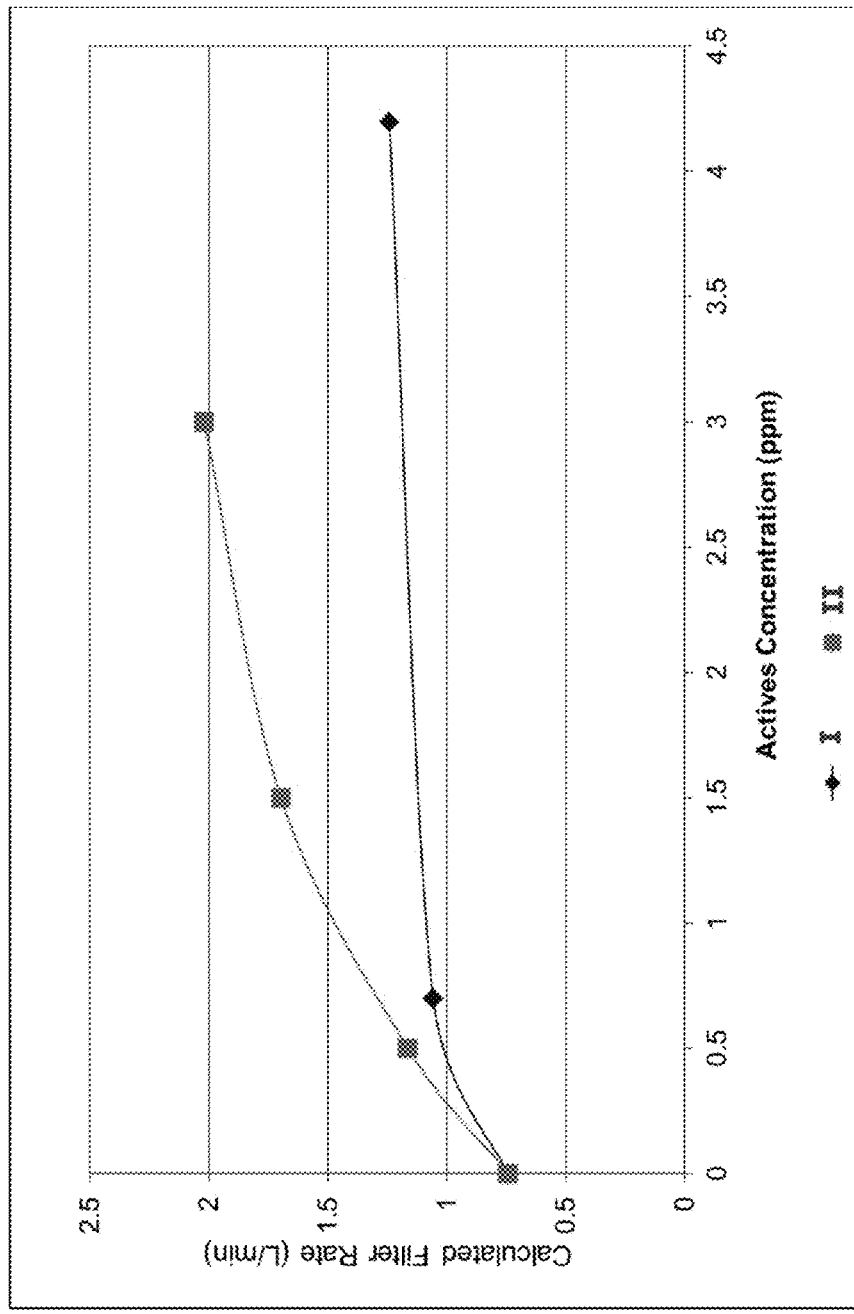
FIG. 1 is a graph illustrating the superior performance of the invention using cross-linked polysaccharide over the prior art uncross-linked polysaccharide.

For purposes of this application the definition of these terms is as follows:

"Consisting Essentially of" means that the methods and compositions may include additional steps, components, ingredients or the like, but only if the additional steps, components and/or ingredients do not materially alter the basic and novel characteristics of the claimed methods and compositions.

"Filter Cake" means the accumulation of solid matter that is retained on a filter, it increases in the course of filtration and becomes thicker as more particulate matter is retained, with increasing layer thickness the flow resistance of the filter cake increases, and if not removed soon enough, eventually thick filter cake can disrupt filtration because the flow resistance of the filter cake gets so high that too little of the mixture to be filtered can pass through the filter cake and filter plugs.

"Liquor" or "Bayer liquor" means a caustic, liquid medium that has run through a Bayer process in an industrial facility.

"Dextran" is a polysaccharide characterized as being an $\alpha$-D-1,6 glucose-linked glucan with side chains 1-3 linked to the backbone units of the polysaccharide.

"Dihydroxypropyl cellulose" means a cellulose derivative with the addition of 1,2-dihydroxypropyl ether group to the cellulose backbone.

"Hydrocyclone" means a device to classify, separate or sort particles in a liquid suspension based on the ratio of their centripetal force to fluid resitance, in particular for dense and coarse particles, and low for light and fine particles, they often have a cylindrical section at the top where liquid is being fed tangentially and a conical base, and they often have two exits on the axis: the smaller on the bottom (for underflow) and a larger one at the top (for overflow), generally the underflow is the denser or coarser fraction, while the overflow is the lighter or finer fraction.

"Thickener" or "Settler" means a vessel used to effect a solid-liquid separation of a slurry, often with the addition of flocculants, the vessel constructed and arranged to receive a slurry, retain the slurry for a period of time sufficient to allow solid portions of the slurry to settle downward (underflow) away from a more liquid portion of the slurry (overflow), decant the overflow, and remove the underflow. Thickener underflow and thickener overflow are often passed on to filters to further separate solids from liquids.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the *Kirk-Othmer Encyclopedia of Chemical Technology*, 5th Edition, (2005), (Published by Wiley, John & Sons, Inc.) this definition shall control how the term is to be defined in the claims.

At least one embodiment of the invention is directed towards enhancing a filtration step utilized within the Bayer process by addition of a composition comprising at least one cross-linked polysaccharide to the slurry entering the filtration step.

In at least one embodiment the filtration of slurry, containing liquor and insoluble solid including red mud, and originating from the overflow of primary settlers used to remove red mud solids from digested bauxite slurry, is enhanced by the addition of a composition comprising a cross-linked polysaccharide to the slurry prior to its application to a filter.

In at least one embodiment the filtration of slurry, containing liquor and alumina trihydrate particles that have been classified, and is collected for use as product, and is filtered in preparation for further processing, is enhanced by the addition of a composition comprising a cross-linked polysaccharide to the feed slurry prior to its application to a filter.

In at least one embodiment the filtration of slurry, containing liquor and fine alumina trihydrate particles to be used as seed in the precipitation process, is enhanced by the addition of a composition comprising a cross-linked polysaccharide to the feed slurry prior to its application to a filter.

In at least one embodiment the filtration of slurry, containing red mud, liquor and water and resulting from the red mud washing process, is enhanced by the addition of a composition comprising a cross-linked polysaccharide to the feed slurry prior to its application to a filter.

In at least one embodiment the stage of the Bayer Process comprises more than one sequential filtration step and the composition comprising a cross-linked polysaccharide is added to filter influent prior to any one, some, or all of the sequential filtration steps.

As described at least in part in U.S. Pat. Nos. 6,726,845, 6,740,249, 3,085,853, 5,008,089, 5,041,269, 5,091,159, 5,106,599, 5,346,628 and 5,716,530, 5,478,477, 5,387,405, and Australian Patents 5310690 and 737191, and International Patent Application WO 2012/031316 A1, polysaccharides have previously been used in the Bayer Process. These references however do not anticipate or teach the use of cross-linked polysaccharides. Neither do any of the references listed above contemplate or teach the application of polysaccharides to the filtration of trihydrate slurry (as either seed material or product size trihydrate solids) or of washed red mud slurry. While U.S. Pat. No. 5,091,159 teaches the use of dextran to enhance filtration of the overflow from primary settling of red mud, the use of cross-linked polysaccharides, and the enhanced benefits thereby derived, are neither contemplated nor expressed in any of the existing prior art.

In at least one embodiment the cross-linked polysaccharide used is at least one or more of the compositions of matter disclosed in US Patent application 2012/0034142 A1.

In at least one embodiment the addition of cross-linked polysaccharide to a slurry prior to filtration is more effective at improving the filtration process than addition to the same slurry of conventional (non-cross linked) polysaccharides having the same or more polysaccharide units.

In at least one embodiment a superior (when compared to a sample containing no polysaccharides or compared to conventional (non-cross linked) polysaccharides) rate of filtration is achieved when the cross-linked polysaccharide is added to the primary settler overflow slurry or washed underflow slurry. The primary settler receives red mud slurry from the digestion stage. The overflow is passed on to a security filter and the underflow is passed through the mud washing stages and eventually on to mud filters.

In at least one embodiment a superior rate of filtration is achieved when the cross-linked polysaccharide is added to trihydrate product slurry.

In at least one embodiment a superior rate of filtration is achieved when the cross-linked polysaccharide is added to trihydrate seed slurry.

In at least one embodiment a superior filtration rate is achieved when the cross-linked polysaccharide is added to the washed red mud slurry.

In at least one embodiment the added cross-linked polysaccharide results in superior deliquoring of the slurry such that the solid material resulting from the filtration process has a reduced moisture content.

In at least one embodiment a superior reduction in cake moisture is achieved when the cross-linked polysaccharide is added to trihydrate product slurry.

In at least one embodiment a superior reduction in cake moisture is achieved when the cross-linked polysaccharide is added to trihydrate seed slurry.

In at least one embodiment a superior reduction in cake moisture is achieved when the cross-linked polysaccharide is added to the washed red mud slurry.

In at least one embodiment a superior reduction in cake moisture is achieved when the cross-linked polysaccharide is added to trihydrate product slurry in combination with water washing of the filtered cake.

In at least one embodiment a superior reduction in cake moisture is achieved when the cross-linked polysaccharide is added to trihydrate product slurry in combination with water washing of the filtered cake where the water wash contains a dewatering aid or where a dewatering aid is otherwise applied to the cake.

In at least one embodiment the cross-linked polysaccharide is added to the feed slurry of a Bayer process filter. The cross-linked polysaccharide may be added as a solid or in a liquid form be it a solution, suspension, or viscous fluid.

In at least one embodiment the filtration process uses gravity.

In at least one embodiment the filtration process is accompanied by vacuum suction.

In at least one embodiment the filtration process is accompanied by pressure.

In at least one embodiment the cross-linked polysaccharide can be added in combination with or according to any of the compositions and methods disclosed in commonly owned and at least partially co-invented U.S. Pat. No. 8,525,266 with the title of THE RECOVERY OF ALUMINA TRIHYDRATE DURING THE BAYER PROCESS USING SCLEROGLUCAN.

In at least one embodiment the cross-linked polysaccharide can be added in combination with other polysaccharides, including dextran.

In at least one embodiment the cross-linked polysaccharide is dextran and/or dihydroxypropyl cellulose. In at least one embodiment the cross-linked polysaccharide is added in the range of 0.1 to 100 ppm, most preferably 0.1 to 20 ppm.

In at least one embodiment a cross-linked polysaccharide is produced by addition of polysaccharide to an alkaline solution containing sodium hydroxide, potassium hydroxide, or other alkali metals or water soluble alkaline earth metal hydroxide, to provide a causticized polymer solution having a pH in the range of 11 to 14. The causticized polysaccharide is then reacted with an appropriate bifunctional cross-linking agent. Suitable cross-linking agents able to react with two or more hydroxyl groups include but are not limited to epichlorohydrin, dichloroglycerols, divinyl sulfone, bisepoxide, phosphorus oxychloride, trimetaphosphates, dicarboxylic acid anhydride, N,N'-methylenebisacrylamide; 2,4,6-trichloro-s-triazine and the like. The cross-linking with one of the above reagents results in the causticized polymer solution becoming a highly viscous solution or paste. When an optimum desired solution viscosity is reached, the reaction can be terminated via pH neutralization of the solution with an appropriate acidic solution examples of which are acetic acid, sulfuric acid, hydrochloric acid and the like.

In at least one embodiment the mass ratio of a general cross-linking reagent/polysaccharide can be varied between, but is not limited to, about 0 to 0.2. Specifically, for epichlorohydrin as the cross linking reagent, the ratio can be varied between, but is not limited to, 0 to 0.1, most preferably 0.005 to 0.08. Appropriate cross-linking is achieved as measured by an increase in the solution viscosity of at least 10% above the original solution viscosity.

In at least one embodiment the composition can be added to said filter feed slurry at one or more locations in a Bayer process where solid-liquid separation occurs.

In certain embodiments of the methods, the cross-linked polysaccharides are copolymers comprising monomers other than saccharides.

EXAMPLES

The foregoing may be better understood by reference to the following examples, which are presented for purposes of illustration and are not intended to limit the scope of the invention.

Example 1

Alumina trihydrate seed thickener underflow slurry samples (1.0 L) were collected from an operating Bayer process refinery just prior to the test and held at temperature (80° C.) until used. The slurry contained about 460 g/L solids. The warm slurry was poured into a suitable size Buchner funnel that contained a coarse filter paper (MN615). For treated slurries the product was added to the slurry prior to pouring into the Buchner funnel and mixed for 1 minute. Vacuum was applied to the slurry to remove the liquor. The time was measured from the initial application of vacuum until a 10 mm section of solids was visible.

The two products tested were.

Product I (0.07% aqueous solution of dextran)

Product II (0.05% aqueous solution of cross-linked dextran)

Doses of solution were measured to deliver the appropriate quantities of "active" material. In the case of cross-linked dextran the active component is defined as the mass of dextran present in solution prior to cross-linking, meaning that the same actives dose of dextran and cross-linked dextran solution contain the same mass of dextran units.

As illustrated in FIG. 1, the addition of cross linked dextran leads to a significantly faster filtration rate than that observed for untreated slurry. Surprisingly, the slurries treated with the cross-linked dextran also have a faster filtration rate than slurries treated with dextran. The filtration rate for the dextran treated slurries also appears to reach a plateau at higher closes whereas the filtration rate for the cross-linked dextran treated slurries continually increases over a broader dose range. Table 1 displays the filter times of the various treatments tested in Example 1.

TABLE 1

Example 1 filter times of trihydrate seed slurry.

| Treatment | Dose of actives (ppm) | Filtration Time (seconds) |
| --- | --- | --- |
| Blank | 0 | 65.3 |
| Product I | 0.7 | 45.9 |
| Product I | 4.2 | 39.1 |
| Product II | 0.5 | 41.8 |
| Product II | 1.5 | 28.6 |
| Product II | 3.0 | 24.1 |

Example 2

The experimental method used in example 2 was the same as that in Example 1 but different solutions of dextran and cross-linked dextran were used. The composition of the products used in example 2 were:

Product III (0.1% aqueous solution of dextran)
Product IV (0.13% aqueous solution of cross-linked dextran)

Figure 2:
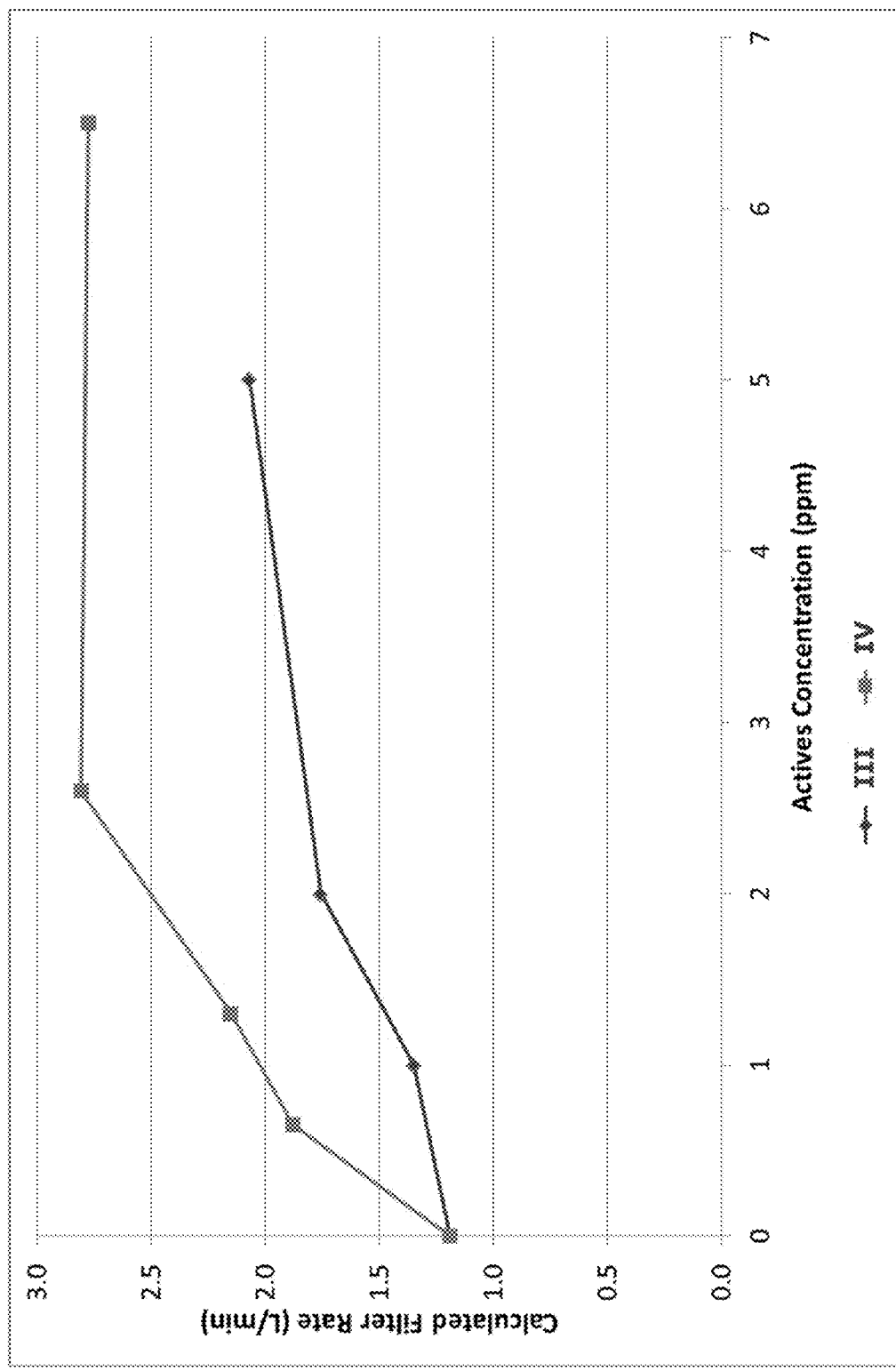
FIG. 2 is a second graph illustrating the superior performance of the invention using cross-linked polysaccharide over the prior art uncross-linked polysaccharide.
Figure 3:
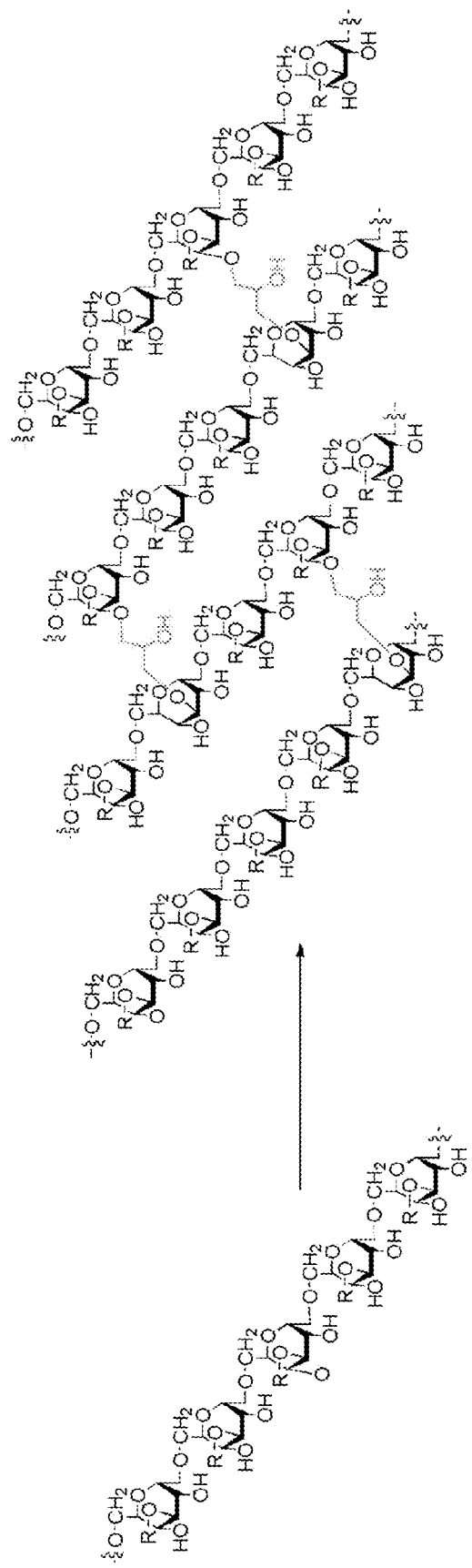
FIG. 3 is an illustration of forming one example of a cross-linked polysaccharide used in the invention.

As can be seen in FIG. 2, the trend observed in example 1, where a surprisingly faster rate of filtration is observed in samples treated with cross-linked to polysaccharide, is again observed in this example.

Table 2 displays the filter times of the various treatments tested in Example 2.

TABLE 2

Example 2 filter times of trihydrate seed slurry.

| Treatment | Dose of actives (ppm) | Filtration Time (seconds) |
|---|---|---|
| Blank | 0 | 41.0 |
| Product III | 1 | 36.2 |
| Product III | 2 | 27.8 |
| Product III | 5 | 23.6 |
| Product IV | 0.65 | 26.0 |
| Product IV | 1.3 | 22.7 |
| Product IV | 2.6 | 17.4 |
| Product IV | 6.5 | 17.6 |

These data show that treatment of slurry with cross-linked dextran results in a filtration rate that is much faster than that observed for either untreated samples or samples treated with dextran that has not been subjected to cross-linking.

Example 3

Alumina trihydrate product slurry (250 ml) was collected from an operating Bayer process plant just prior to the test and held at 65° C. in a rotating water bath until used. Samples of de-ionised water (200 mL) were also collected and held at 65° C. until required. The filtration process was assessed by pouring the warm slurry (250 ml) into a Buchner funnel (130 mm diameter) and applying the vacuum for 40 seconds. The vacuum was then turned off and the warm wash water (200 mL) was then added to the top of the de-liquored solids. The vacuum was then again applied for 40 seconds to draw the wash water through the cake and remove as much adsorbed liquor and water as possible. A sample of the filtered and washed solid cake was then taken, weighed and placed in an oven (110° C.) for drying. The dried solids were subsequently removed from the oven, cooled and re-weighed to determine the mass of adsorbed water lost on drying from the filtered cake. This water loss was recorded as the moisture content of the filtered solids.

For treated samples the appropriate quantity of Product V (0.065% aqueous solution of cross-linked dextran) was added to the slurry and mixed in, one minute prior to filtration. For samples where dewatering aid was added a generic, commercially available fatty acid based dewatering aid, denoted here as DWA1, was used. In those cases where dewatering aid treatment was employed, a dose of 15 μL DWA1 was added to the de-ionised water and mixed, immediately prior to the water being used for washing.

The residual moisture measured in the resulting filter cake from various treatments is shown in table 3. Clearly the moisture content of the cake is substantially reduced by the application of cross-linked dextran (product V) either alone or in combination with a conventional dewatering aid. The reduction in moisture is indicative of more efficient and effective filtration resulting in improved liquor flow through the cake and thereby better separation of solid from the liquor and/or wash water. When used in combination with the dewatering aid, the resulting moisture content is surprisingly substantially improved beyond that observed using either product alone, indicating a synergistic effect between the two treatments.

TABLE 3

Example 3 residual moisture present in filter cake after treatment

| Treatment | Dose Actives (ppm) | Moisture content (%) |
|---|---|---|
| Untreated | 0 | 11.0 |
| Product V | 1.95 | 5.64 |
| DWA 1 | 0 | 8.59 |
| Product V + DWA 1 | 1.95 | 3.21 |

Example 4

A slurry of red mud was prepared by combining red mud and liquor from an operating refinery with water. The resulting slurry consisted of 80 g/L red mud solids and a caustic liquor concentration of ~15 g/L as $Na_2CO_3$. Individual slurry samples (1 L) were held at 50° C. in a rotating water bath prior to the filtration process. Slurry samples were taken and poured into the 2 L pressure filter that used a 0.45 μm PALL filter paper as the filtration medium. The pressure vessel was then sealed and pressurized to 40 psi. Liquor discharged out the bottom of the vessel leaving the red mud solids on the filtration medium in the vessel. The filtration rate was determined by recording the time taken to discharge the full volume of liquid from the vessel. The samples were treated by removing the red mud slurry from the rotating water bath and adding the appropriate amount of Product VI (0.026% aqueous solution of cross-linked dextran) and inserting back in the rotating water bath to mix for 1 minute. The cross-linked dextran treated samples were then tested in the same manner as untreated samples. The discharge times of the treated and untreated red mud slurries are shown in Table 4 below.

The results displayed in Table 4 demonstrate the improvement in filtration rate for red mud slurry that has been treated with cross-linked dextran. Discharge times for those samples treated with cross-linked polysaccharide were significantly reduced.

TABLE 4

Liquor discharge times for filtration of red mud slurry

| Treatment | Dose (ppm) | Discharge Time (minutes.seconds) |
|---|---|---|
| Un-treated | 0 | 21.05 |
| Un-treated | 0 | 20.03 |
| Un-treated | 0 | 20.23 |
| Product VI | 0.26 | 13.08 |
| Product VI | 0.26 | 13.01 |
| Product VI | 0.65 | 12.47 |
| Product VI | 0.65 | 13.30 |

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments described herein and/or incorporated herein. In addition the invention encompasses any possible combination that also specifically excludes any one or some of the various embodiments described herein and/or incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range. All percentages, ratios and proportions herein are by weight unless otherwise specified.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method of enhancing filtration of slurry produced within a Bayer process, the method comprising: adding a composition comprising at least one cross-linked polysaccharide to the slurry to create a treated slurry; and filtering the treated slurry.

2. The method of claim 1, wherein the composition consists essentially of cross-linked polysaccharide.

3. The method of claim 1, wherein solids obtained from the filtering have less residual moisture than a filtered sample of the slurry in which either no composition was added or in which a composition comprising the same type and amount of polysaccharides but in a non-cross linked form was added.

4. The method of claim 1, wherein the treated slurry has a faster filtration rate than a filtered sample of the slurry in which either no composition was added or in which a composition comprising the same type and amount of polysaccharides but in a non-cross linked form was added.

5. The method of claim 1, wherein the treated slurry further comprises red mud and is filtered via red mud security filtration.

6. The method of claim 5, wherein the treated slurry further comprises alumina trihydrate product and is filtered via alumina trihydrate product filtration.

7. The method of claim 1, wherein the treated slurry further comprises alumina trihydrate seeds and is filtered via alumina trihydrate seed filtration.

8. The method of claim 1, wherein the treated slurry further comprises red mud and is filtered via red mud filtration.

9. The method of claim 1, further comprising contacting solids obtained from the filtering with at least one of washwater and washwater containing a dewatering aid.

10. The method of claim 1, wherein the at least one cross-linked polysaccharide is produced from at least one of dihydroxypropyl cellulose and dextran.

11. The method of claim 1, wherein the at least one cross-linked polysaccharide is produced from one or more cross-linking agents selected from the group consisting of: epochlorohydrin; dichloroglycerol; divinyl sulfone; bisepoxide; phosphorus oxychloride; a trimetaphosphate; dicarboxylic acid anhydride; N,N'-methylenebisacrylamide; 2,4,6-trichloro-s-triazine and combinations thereof.

12. The method of claim 1, wherein the at least one cross-linked polysaccharide is a copolymer comprising monomers other than saccharides.

13. The method of claim 1, wherein the filtering incorporates the application of vacuum, pressure, gravity, and combinations thereof.

14. The method of claim 1, wherein the composition comprising the at least one cross-linked polysaccharide is added to the slurry as a solid or a liquid.

15. The method of claim 1, wherein the slurry selected from the group consisting of: underflow from a settler in a clarification stage, overflow from a settler in a clarification stage, underflow from a washer in a red mud washing stage, underflow from a settler in a classification stage, underflow from a hydrocyclone, and overflow from a hydrocyclone.

16. The method of claim 1, further comprising adding scleroglucan to at least one of the slurry and the treated slurry.

* * * * *